Dec. 8, 1953 — L. S. WILBUR — 2,661,942
RESILIENT CUSHIONING DEVICE
Filed Nov. 14, 1950
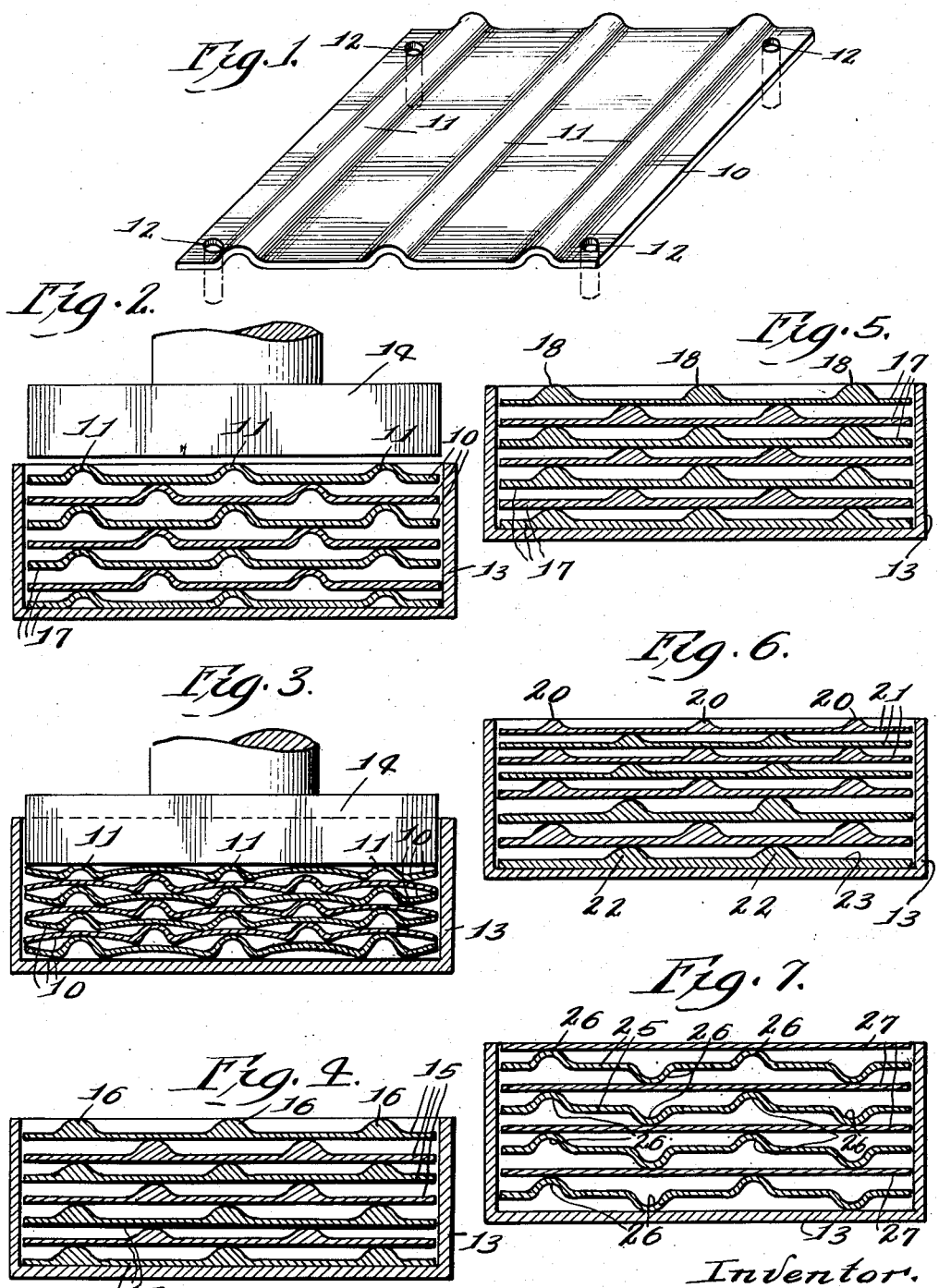
Inventor.
Lawrence S. Wilbur.
By Harold Olsen
Attorney.

Patented Dec. 8, 1953

2,661,942

UNITED STATES PATENT OFFICE 2,661,942

RESILIENT CUSHIONING DEVICE

Lawrence S. Wilbur, Chicago, Ill., assignor to Flexible Metals Corporation, Chicago, Ill., a corporation of Illinois Application November 14, 1950, Serial No. 195,570

5 Claims. (Cl. 267—2)

1

This invention relates to improvements in resilient cushioning devices which have many and varied applications in industry.

Essentially, the invention aims to provide a resilient cushioning device in the form of stacked sheet metal plates which are flexible and resilient and which plates are provided with ribs, corrugations or other projections, the plates being so arranged in the stack that the stack may be compressed under conditions of load.

A principal object of the invention is to provide a resilient cushioning device which is capable of absorbing tremendous shocks within a relatively restricted area and volume.

A further object of the invention is to provide a structure of the character described which is easily manufactured and easily assembled and installed and which may be quite readily varied for use in different places under different load conditions.

Still another object of the invention is to provide a resilient cushioning device which may be used as an auxiliary to existing spring structures to bolster up and renew such structures which may have lost much of their utility through long use.

Still another object of the invention is to provide a spring structure composed of a plurality of stacked flexible and resilient sheet metal plates provided with ribs or projections which may easily be produced by known rolling and forming processes.

With these and other objects in view, the invention consists substantially of the devices illustrated in the accompanying drawings together with such modifications thereof as come within the scope of the invention as defined in the appended claims.

In the drawings,

Fig. 1 is a perspective view of a sheet metal plate which forms one of the elements of my new device;

Fig. 2 is a view in cross section of a stack of elements such as that illustrated in Fig. 1, showing the relative position of the elements when no load is applied;

Fig. 3 is a view similar to Fig. 2 showing the flexing of the individual elements of the stack under load;

Fig. 4 is a view similar to Fig. 2 showing a modified form of my device.

Fig. 5 is a view similar to Fig. 2 showing another modification;

Fig. 6 is a view similar to Fig. 2 showing still another form; and

2

Fig. 7 is a view similar to Fig. 2 showing still another modification.

The device of my invention may be employed wherever springs are now generally used or in lieu of blocks of compressible material, such as rubber and the like, for the purpose of absorbing shocks and to provide for vibration dampening to prevent wear on parts.

The basic element of my new device is a sheet metal plate such as that illustrated in Fig. 1 and designated by the general reference character 10. As here shown, this sheet metal element is generally of rectangular form but it will be obvious that other configurations may be employed to suit particular conditions of use.

The plate 10 is provided with a plurality of ribs or corrugations 11 which extend in substantial parallelism across one face of the plate and project upwardly therefrom. These ribs or corrugations may be made as deep or as shallow as desired, depending upon the load conditions for which the device is intended.

In Fig. 1 the plate 10 is shown as being provided with apertures 12 in the corners, so that a plurality of such plates 10 may be assembled into a stack by passing suitable pins through the openings 12 in the plates, thus to keep them in proper assembled relation and eliminate any possibility of any substantial relative movement with respect to each other.

A plurality of sheet metal plates such as the plate 10 of Fig. 1 may be assembled into a stack as shown in Fig. 2, the stack being placed in a guide chamber or receptacle 13 which serves to keep the plates in proper stacked relation and prevents their relative movement. This will be in lieu of the use of pins passing through corner apertures as heretofore described.

As will be seen from an inspection of Fig. 2, the plates are assembled in the stack in such a way that the ribs or corrugations 11 on one plate will lie in contact with the flat portion of an adjacent plate. In other words, the ribs or corrugations are staggered with respect to each other.

By this arrangement the flat portions of each plate will be flexed upon the ribs or corrugations of an adjacent plate and this takes place through the stack so that under load the stack will look in cross section substantially the way it is illustrated in Fig. 3.

In Figs. 2 and 3, the reference numeral 14 indicates diagrammatically a load member which is resting on the top plate of the stack. This load member may be anything at all that needs to be resiliently supported such, for example, as an engine mounting, a freight car truck support, draft gear rod, etc., etc.

In Fig. 4 I have shown a modification of my invention in which the ribs or projections are in the form of solid bars rather than hollow corrugations as shown in the embodiment illustrated in Fig. 2. In said Fig. 4, reference numeral 15 indicates a flexible and resilient sheet metal plate provided with a plurality of solid ribs or projections 16 which it will be understood extend in substantial parallelism across one face of the plate 15 in the same way as do the corrugations 11 on the plate 10. Such a sheet or plate 15 with such ribs 16 thereon may be produced by any of the well known rolling or pressing processes employed in metal industries.

It will be observed from Fig. 4 that a plurality of such sheets or plates 15 are assembled in the same way as the plates 10 are assembled in Fig. 2, it being clear that the ribs or projections 16 are staggered with respect to each other so that the flat portions of one plate are in contact with the ribs or projections on an adjacent plate.

In Fig. 5, I have illustrated a further modification of the invention. Essentially the difference between the disclosure of Fig. 5 and Figs. 2 and 4 is that the sheets or plates are made of progressively increasing thickness, which is to say of heavier gauge, from the top sheet to the bottom sheet. In said Fig. 5, the sheets or plates 17 are provided with a plurality of ribs or projections extending across one face of the plate and the plates are so arranged that said projections or ribs are staggered, as in the other figures heretofore described.

It will be clear also that the arrangement of Fig. 5 may be used where the plates or sheets are provided with corrugations as shown in Fig. 2, as well as when they are provided with the solid form of ribs shown in Figs. 4 and 5.

In Fig. 6, I have illustrated a further modification of the invention. In this figure the essential change from the other embodiments resides in that the corrugations or ribs or projections are made of gradually increasing height or depth from the top plate to the bottom plate. By referring to said Fig. 6, it will be seen that the projections 20 on the upper plate 21 are shallow or of little height as compared to the projections 22 on the bottom plate 23.

Here, again, it is pointed out that while the ribs or projections in Fig. 6 are shown in solid form, they may also be open corrugations of the form shown in Fig. 2.

In Fig. 6, it is also shown that the plates are of gradually increasing thickness from the top of the stack to the bottom, but this is not essential. The sheets or plates may be of the same thickness throughout the stack, as are the sheets or plates 15 of Fig. 4 but changed therefrom by making the ribs or projections of progressively different depth or height from the top to the bottom of the stack.

In the modification shown in Fig. 7, I provide sheets or plates 25 which are provided with oppositely directed ribs or corrugations 26 and having straight or flat portions between said ribs or corrugations. In this form of the invention, the plates 25 are stacked with flat plates 27 located between such corrugated plates 25. This arrangement will provide a highly compressible resilient structure capable of withstanding very considerable loads.

By employing one or more of the foregoing variations, it is possible to produce and assemble a stack of flexible and resilient sheet metal members in such a way as to produce a cushioning and shock-absorbing device for almost any conceivable load condition.

The stacks may be made of as many superposed sheets or plates as the particular installation may require. It is further clear that even after a stack has been installed, additional sheets or plates may be added to the top of the stack, as required.

It will be understood also that the ribs, corrugations or projections may be spaced at varying distances depending upon the nature of the work that is to be done and the amount of load that is to be absorbed. Generally speaking, a wider spacing of the ribs or corrugations will produce greater flat areas and thus more flexing, so that the stack is relatively soft and easily compressed by light loads. When the corrugations are closer together, the flat areas are smaller and there will be less flexibility and therefore the stack will be more difficult to compress and will consequently support heavier loads.

It will also be understood that in the embodiments of the invention where the plates are of gradually increasing thickness from the top to the bottom, the relatively thin upper sheets or plates will be easily flexed and flexing becomes more difficult progressively downward in the stack. So it may be that the upper sheets may be practically completely pressed into contact while the load is still being absorbed by the heavier less flexible plates near the bottom of the stack. By a suitable arrangement of the plates in the stack and the selection of the right number of plates for a particular job, it will be easy to produce devices which will never "bottom."

It will also be noted that the corrugations or ribs are rounded at the juncture with the flat portions of the plates so as to reduce to the greatest possible degree the danger of rupture along the meeting lines.

My device may also be used as an auxiliary cushioning device for existing spring structures. For example, it is well known that in certain heavy spring supports the support level may settle after a period of use due to constant compression of the spring with resultant loss of resiliency. In such instances, a stack of my flexible plates may be added to the top or bottom of such a spring installation so as to bolster the same up and bring the supporting level to its original and normal position, and this is accomplished by adding a resilient stack of my invention, as distinguished from the present common practice of merely using solid blocks of material for that purpose.

I claim as my invention:

1. A resilient cushioning device comprising a plurality of resilient plates stacked one upon another, said plates having a plurality of projections extending in substantial parallelism across one face thereof and flat portions between said projections, said plates being stacked with the projections on one plate in contact with the flat portions of an adjacent plate, and means for maintaining said plates in stacked relation.

2. A resilient cushioning device comprising a plurality of resilient plates stacked one upon another, said plates being of gradually increasing thickness from the upper to the lower plate of said stack, said plates having a plurality of projections extending in substantial parallelism across one face thereof and flat portions between said projections, said plates being stacked with the projections on one plate in contact with the flat portions of an adjacent plate, and means for maintaining said plates in stacked relation.

3. A resilient cushioning device comprising a plurality of resilient plates stacked one upon another, said plates having a plurality of projections extending in substantial parallelism across one face thereof and flat portions between said projections, said projections being of gradually increasing height from the top plate to the bottom plate of said stack, said plates being stacked with the projections on one plate in contact with the flat portions on an adjacent plate, and means for maintaining said plates in stacked relation.

4. A resilient cushioning device comprising a plurality of resilient plates stacked one upon another, said plates being of gradually increasing thickness from the upper to the lower plate of said stack, said plates having a plurality of projections extending in substantial parallelism across one face thereof and flat portions between said projections, said projections being of gradually increasing height from the top plate to the bottom plate of said stack, said plates being stacked with the projections on one plate in contact with the flat portions of an adjacent plate, and means for maintaining said plates in stacked relation.

5. A resilient cushioning device comprising a plurality of resilient plates stacked one upon another, said plates having a series of integrally formed ribs extending upwardly from one face of said plates and flat portions between said ribs, said plates being stacked with the ribs on one plate in contact with the flat portions of an adjacent plate, and means for maintaining said plates in said stacked relation.

LAWRENCE S. WILBUR.

References Cited in the file of this patent

UNITED STATES PATENTS

| Number | Name | Date |
|---|---|---|
| 50,415 | Black | Oct. 10, 1865 |
| 1,139,732 | Slick | May 18, 1915 |

FOREIGN PATENTS

| Number | Country | Date |
|---|---|---|
| 27,650 | Denmark | May 9, 1921 |
| 16,905 | Great Britain | July 14, 1910 |
| 140,465 | Great Britain | June 20, 1921 |